United States Patent
Zucker

(10) Patent No.: US 11,087,370 B2
(45) Date of Patent: Aug. 10, 2021

(54) SYSTEM AND METHOD FOR ADMINISTERING CHARITABLE AUCTIONS

(71) Applicant: Larry Zucker, Anaheim, CA (US)

(72) Inventor: Larry Zucker, Anaheim, CA (US)

( * ) Notice: Subject to any disclaimer, the term of this patent is extended or adjusted under 35 U.S.C. 154(b) by 1078 days.

(21) Appl. No.: 15/612,223

(22) Filed: Jun. 2, 2017

(65) Prior Publication Data
US 2019/0259072 A1     Aug. 22, 2019

Related U.S. Application Data
(60) Provisional application No. 62/488,172, filed on Apr. 21, 2017.

(51) Int. Cl.
| | | |
|---|---|---|
| G06Q 30/08 | (2012.01) | |
| G06Q 20/40 | (2012.01) | |
| G06Q 30/02 | (2012.01) | |

(52) U.S. Cl.
CPC ....... G06Q 30/0279 (2013.01); G06Q 20/405 (2013.01); G06Q 30/08 (2013.01)

(58) Field of Classification Search
None
See application file for complete search history.

(56) References Cited

U.S. PATENT DOCUMENTS

| | | | |
|---|---|---|---|
| 2006/0167970 A1* | 7/2006 | Seeley | H04M 3/5191 709/202 |
| 2010/0049652 A1 | 2/2010 | Young | |
| 2013/0090998 A1* | 4/2013 | Shimogori | G06Q 30/0609 705/14.23 |
| 2014/0278861 A1 | 9/2014 | Bush | |

* cited by examiner

*Primary Examiner* — Jan P Mincarelli
(74) *Attorney, Agent, or Firm* — Eric Karich; Karich & Associates

(57) ABSTRACT

A system and method for administering charitable auctions which generates a donation screen in electronic form that includes a donation button that indicates the guest would like to donate a surcharge donation to a philanthropic cause, and a refusal button that indicates that the guest would not like to donate. Once the guest determines whether to donate, a bid authorization is generated for the guest so that he or she may bid in the charitable auction. Following the auction, the guest is charged for any purchases during the auction, plus a surcharge donation if authorized.

11 Claims, 3 Drawing Sheets

SYSTEM AND METHOD FOR ADMINISTERING CHARITABLE AUCTIONS

CROSS-REFERENCE TO RELATED APPLICATIONS

This application for a utility patent claims the benefit of U.S. Provisional Application No. 62/488,172, filed Apr. 21, 2017.

BACKGROUND OF THE INVENTION

Field of the Invention

This invention relates generally to systems and methods for collecting charitable donations, and more particularly to a system and method for administering charitable auctions that provides for a collection of an additional surcharge donation as an integral part of the auction process.

Description of Related Art

The prior art teaches a variety of philanthropic donation systems that enable consumers to make charitable contributions while purchasing products.

Bush, 2014/0278861, teaches a philanthropic donation system for user-directed donations from a company to a charity in which an affiliate company agrees to donate a percentage of each transaction with a registered user to one or more charities selected by the user. The user may also select a percentage of each donation which is to be donated to each of its selected charities. The user conducts the transaction with a personal payment account, which is any form of payment which is not specific to a single company or related group of companies. In this way, the user may conduct business with substantially any business and generate donations which the user directs, so long as the business is an affiliate.

Young, U.S. 2010/0049652, teaches a philanthropic donation system that enables a user to make donations to charities every time they make a purchase using a credit or debit card. A charity or charities are selected, and a donation amount is selected, either a percentage of the purchase, or a set dollar amount. The credit card is charged for the donation when the purchases are made.

The prior art teaches philanthropic donation system that enable charitable giving while making purchases of products, via credit cards, or through affiliate sales programs, or the like. However, the prior art does not teach such a system which may be implemented as part of a charitable auction, wherein a surcharge donation may be authorized prior to bidding in the charitable auction. The present invention fulfills these needs and provides further advantages as described in the following summary.

SUMMARY OF THE INVENTION

The present invention teaches certain benefits in construction and use which give rise to the objectives described below.

The present invention provides a system and method for administering charitable auctions. The system and method perform the following steps: receiving list of guests; receiving an electronic payment identifier for each of the guests; receiving an authorization signature from each of the guests authorizing payment for winning bids; generating a donation screen in electronic form that includes a donation button that indicates the guest would like to donate a surcharge donation to a philanthropic cause, and a refusal button that indicates that the guest would not like to donate; receiving a selection from the guest of either the donation button or the refusal button; generating a bid authorization for the guest; conducting the charitable auction, enabling the guests to participate in the auction using the bid authorizations; determining, for each of the guests who have made purchases during the auction, and who have selected the donation button, a surcharge donation; and collecting payment from each of the guests for any auction purchases, plus any surcharge donations authorized.

A primary objective of the present invention is to provide systems and methods for administering charitable auctions, the systems and methods having advantages not taught by the prior art.

Another objective is to provide a system and method for administering charitable auctions that provides for a collection of an additional surcharge donation as an integral part of the auction process.

Another objective is to provide a system and method wherein the surcharge donation is authorized prior to bidding in the charitable auction.

A further objective is to provide a system and method for administering charitable auctions that is easy to administer, provides better results in funds raised, and which does not unduly burden the participants in the auction process.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings.

DETAILED DESCRIPTION OF THE INVENTION

The above-described drawing figures illustrate the invention, a system and method for administering charitable auctions. Importantly, the system and method provide for a collection of an additional surcharge donation as an integral part of the auction process, without adding a significant additional administrative burden, or interfering with the administration of the charitable auctions.

Figure 1:
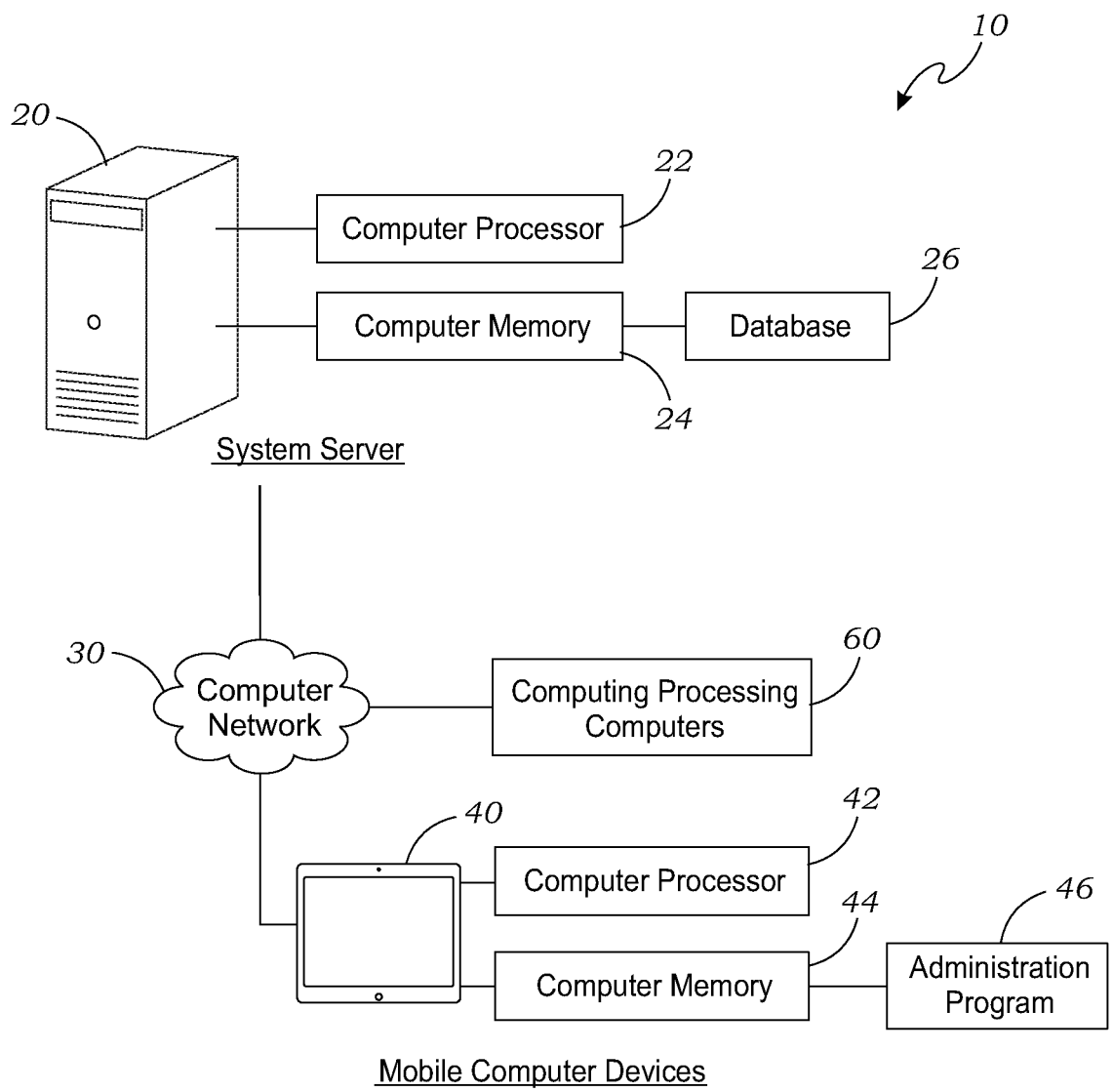
FIG. 1 is a block diagram of a computer system that may be utilized to execute the present system for administering charitable auctions, the computer system including a system server and a portable computer device.

FIG. 1 is a block diagram of a computer system 10 that may be utilized to administer the charitable auctions. As shown in FIG. 1, the computer system 10 includes a system server 20 that communicates via a network 30 with a portable computer device 40 (or, in practice, a plurality of such devices). The system server 20 includes a computer processor 22 and a computer memory 24. The computer memory 24 includes a database 26 for storing data, as described below. The general construction of the system server 20 is well known in the art of providing such servers, and is therefore not discussed in greater detail herein.

The portable computer device 40 includes a computer processor 42 and a computer memory 44. The computer memory 44 includes an administration program 46 for performing the functions of the system 10, as described in greater detail below. The system 10 may further operatively interact with other outside systems, such as a computer processing computer 60 for performing banking transactions, and other systems known in the art.

Figure 2:
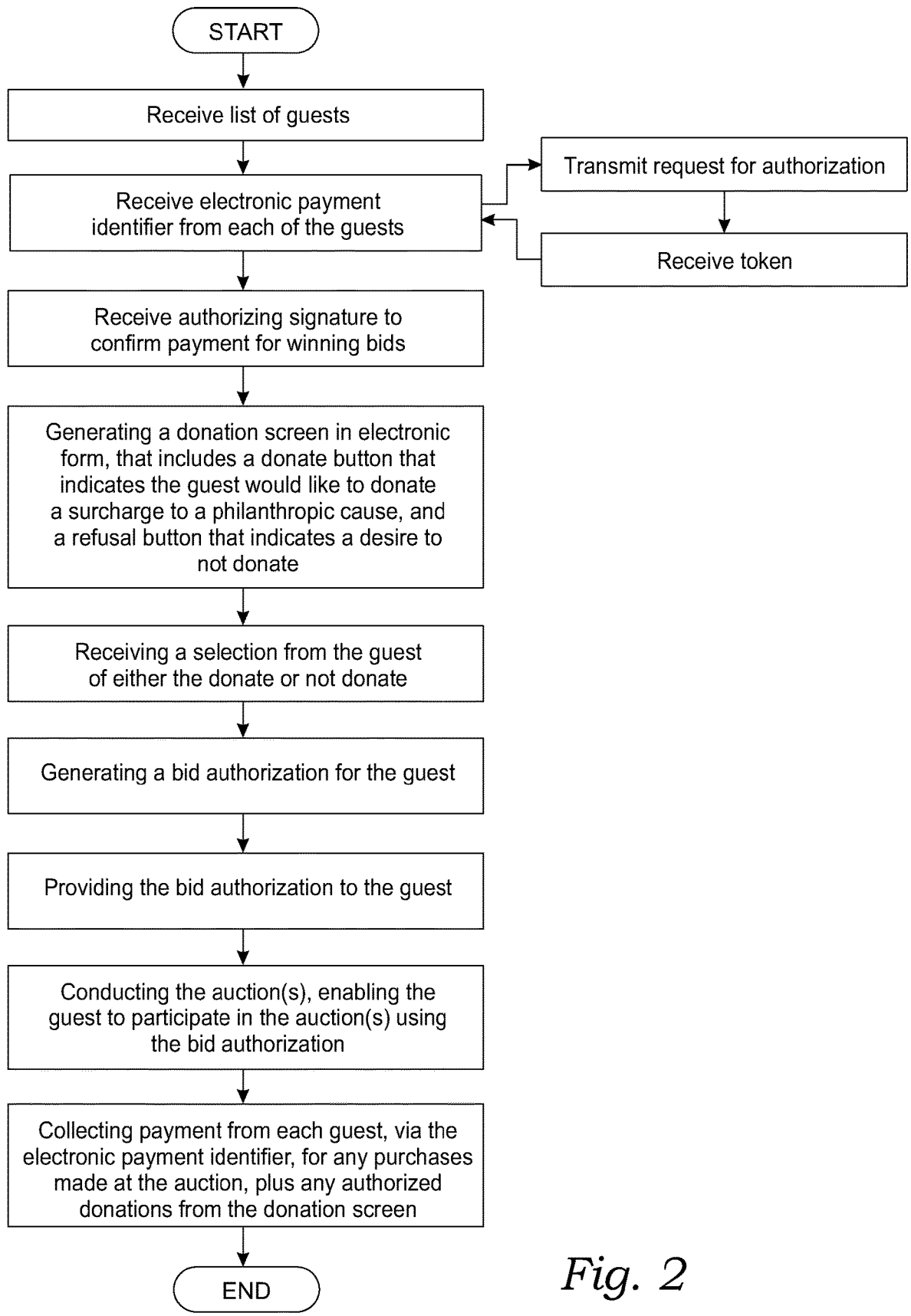
FIG. 2 is a flow diagram illustrating the operation of the system of FIG. 1.

FIG. 2 is a flow diagram illustrating the operation of the system 10 for administering charitable auctions. As shown in FIG. 2, the system 10 of FIG. 1 receives a list of guests (i.e., persons or entities participating in the charitable auction), typically from the nonprofit sponsoring the charitable auction, although the list may be received in any manner from any source. The list of guests may include names, contact information (e.g., cellphone numbers, email addresses, and related information), and related information, and may further include a table number for reserved seating, helpful information about the guest, etc. This information may be stored in the database described above, or an equivalent data storage system.

Each of the guests is typically contacted, at which time this information may be confirmed, updated, etc., and the guest may confirm, change or provide their cell phone number and email address. At this time, the guest may be asked for an electronic payment identifier, (e.g., credit or debit card number, Paypal® information, bank number, electronic check, etc.). The credit card may be run, typically for a small amount, e.g., $1, similar to service stations, and an approval and token is received, e.g., using tokenization from the authorization company. Additional information may also be collected or confirmed at this time (e.g., residential address, zip code, etc., to match the record when running the card), according to methods known in the art.

The guest is then asked to authorize the transaction with an authorization signature, such as by signing a generated screen (not shown) on the portable computer device to confirm that they will pay for all winning bids and pay for any donations made at the event. Other methods of authorization known in the art may also be used, e.g., thumbprint or other biometric, keying in a password or authorization code, etc.), and the term "authorization signature" is defined to include these and other methods of indicating authorization known in the art, or developed in the future.

At this time, while the persons administering the current system are already interacting with the guest, and the guest is already using the portable computer device, that the present invention teaches using this device to collect an added surcharge donation for the charity.

Figure 3:
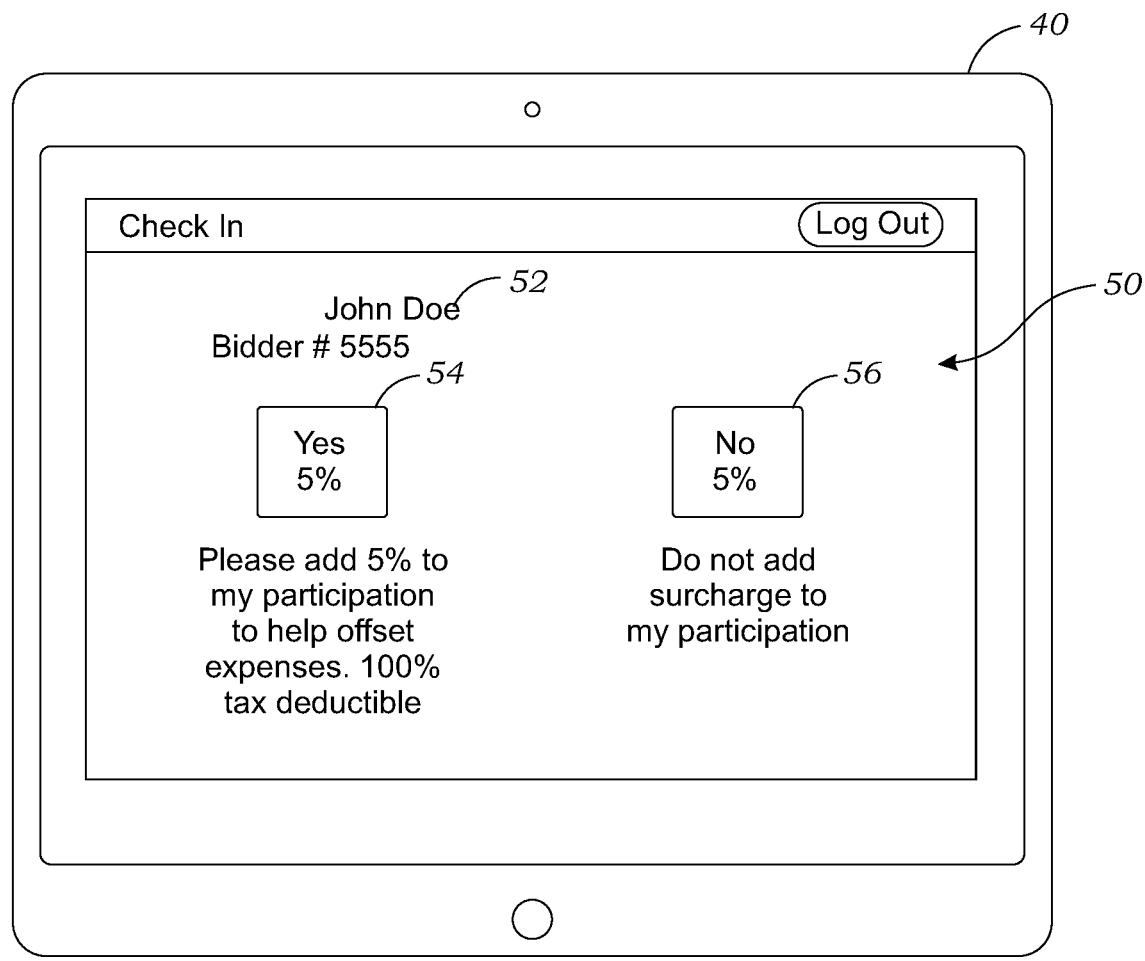
FIG. 3 is a screen capture generated by an administration program operably installed on the portable computer device.

FIG. 3 is a screen capture generated by an administration program 46, shown in FIG. 1, which is operably installed on the portable computer device 40. In the embodiment of FIG. 3, the screen capture illustrates a donation screen 50 that includes the guest name 52, as well as two buttons for authorizing (or not authorizing) an additional surcharge donation to be paid by the guest. In the embodiment of FIG. 3, the two buttons include a donation button 54 (i.e., a green button or box) and the other is a refusal button 56 (i.e., a red button or box). The guest is informed that if they click on the green donation button 54, then a percentage of their auction spending (e.g., 5%, or other percentage set by the administrator, or a set dollar amount selected by the nonprofit) will be added to their bill (based on their spending). If using 5%, the guest may be informed, for example, "if you click on the green button then 5% of your total spending will be added to your spending at this event, so if you spend $100, then it will be rounded up to $105 to help underwrite event costs." Or "If you click the red button then no dollars will be added to your balance (unless the non profit uses a set $ amount, such as $10)."

In one embodiment, the surcharge donation is a percentage of the total amount spent in the auction (or auctions, or certain selected auctions or other charitable donation mechanism). The percentage may be pre-set, set by the guest, set as a the credit card processing fee, selected from multiple options, or any other method known in the art, or devised by one skilled in the art in the future. Alternatively, the surcharge donation may be a set dollar amount, also which may be set by either the system or the guest. In yet another alternative embodiment, the surcharge donation may be an amount that "rounds up" the money spent. Any other methods or systems known in the art, or devised in the future, should be considered within the scope of the present invention, and the stated examples are intended to be exemplary rather than an exhaustive list of options available.

Importantly, this decision to donate is made prior to the actual auction, so the amount of the donation is not known at the time of the selection. This may be zero if no purchases are made during the auction, or it may be a greater amount if significant purchases are made at the auction. If a percentage is selected, and then the guest makes significant purchases during the auction, the surcharge donation may be significant.

For purposes of this application, the term "button" is defined to mean any form of button (physical or GUI), actuation element, or other form of clickable or actuable GUI device or other mechanism (e.g., voice control, etc.), and/or any equivalent device or method. Those skilled in the art may devise alternative systems or mechanisms other than a typical rectangular button, and such alternatives known in the art should be considered within the definition of the term "button."

Referring again to FIG. 2, once the guest has made his or her selection, the guest is then provided with a bid authorization, such as, for example, stickers to use for bidding on bid sheets, or they are sent (via, e.g., a text message or email) a link to use in mobile bidding if electronic bidding is used instead of bid sheet bidding. The charitable auction is held, enabling the guests to participate in the auction using the bid authorizations. As mentioned above, a wide range of charitable giving options may be included, and some or all of these activities may be included in the calculation of the surcharge donation.

The auction(s) are then held, with bidding proceeding as known in the art. At the end of the auction(s), the system 10 may be used, at the touch of a button, to send a text to those that did not purchase anything telling them that they did not purchase anything and that frees up their dollars to participate in other auctions, such as a traditional raise the paddle/donation ask and a live auction.

A second button may be pushed to send a text to those that purchased items telling them what they purchased and spent in the silent auction. For each of the guests who have made purchases during the auction, and who have selected the donation button, the surcharge donation is calculated, and payment is received from each of the guests for any auction purchases, plus any surcharge donations authorized. All credit cards are then run with the dollars being deposited directly into a suitable account, such as the nonprofit's account, or alternatively an account of the persons administering the current system. The same method may be used for the raise the paddle/donation ask, and any live auctions.

At the end of the evening all guests are emailed a folio statement showing their participation in the silent auction, the raise the paddle/donation ask, the live auction, wine pulls (if featured), raffle tickets (if featured), and other revenue streams.

The system 10 may be administered using downloadable programs (or apps), or alternatively via a browser application that is configured to receive and to send web pages, web-based messages, or the like. The browser application may be configured to receive and display graphics, text, multimedia, or the like, employing virtually any web-based language, including a wireless application protocol messages (WAP), or the like. In one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and/or any alternative or equivalent language known in the art. In one embodiment, a user of the user computer may employ the browser application to perform various actions over a network. The user computers may also include a client application (or "app," not shown) that may be downloaded or otherwise installed and configured to receive and/or send data as described below.

The network may include any device or system for communicating information from one computer device to another. For example, a global computer network (e.g., the Internet) may be used, including any form of local area networks (LANs), wide area networks (WANs), direct connections, such as through a universal serial bus (USB) port, other forms of computer-readable media, or any combination thereof. On an interconnected set of LANs, including those based on differing architectures and protocols, a router may act as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. The network may further include any form of wireless network, including cellular systems, WLAN, Wireless Router (WR) mesh, or the like. Access technologies such as 2G, 3G, 4G, and future access networks may enable wide area coverage for mobile devices. In essence, the wireless network may include any wireless communication mechanism known in the art by which information may travel between computers of the present system 10.

The system server 20 may include one or more servers, desktop computers, multiprocessor systems, microprocessor-based or programmable electronics devices, network appliances, or any form of equivalent device(s) known in the art. The system computer may be in the form of a single device, or multiple devices. The system server 20 may be distributed over a plurality of network devices and/or implemented using cloud architecture. The system server 20 may operate using a master/slave approach over a plurality of network devices, within a cluster, a peer-to-peer architecture, and/or any of a variety of other architectures.

For purposes of this application, as discussed below, any element mentioned in the singular also includes the plural, so it is to be understood that the term "computer processor" also includes multiple processors, and the term "computer memory" includes multiple memory devices, and either of which may be configured in any manner known in the art (i.e., in a single device, or distributed in any manner known to those skilled in the art).

The following includes definitions of selected terms employed herein:

The terms "computer," "computer device," and "server" as used herein, refers to a device and/or system of devices that include at least one computer processing element, e.g., a central processing unit (CPU), and some form of computer memory having a capability to store data. The computer may comprise hardware, software, and firmware for receiving, storing, and/or processing data as described below. For example, a computer may comprise any of a wide range of digital electronic devices, including, but not limited to, a server, a desktop computer, a laptop, a smart phone, a tablet, or any form of electronic device capable of functioning as described herein.

The term "database" as used herein, refers to any form of one or more (or combination of) relational databases, object-oriented databases, hierarchical databases, network databases, non-relational (e.g. NoSQL) databases, document store databases, in-memory databases, programs, tables, files, lists, or any form of programming structure or structures that function to store data as described herein.

The term "computer memory" as used herein refers to any tangible, non-transitory storage that participates in providing instructions to a processor for execution. Such a medium may take many forms, including but not limited to, non-volatile media, volatile media, and any equivalent media known in the art. Non-volatile media includes, for example, ROM, magnetic media, and optical storage media. Volatile media includes, for example, DRAM, which typically serves as main memory. Common forms of computer memory include, for example, hard drives and other forms of magnetic media, optical media such as CD-ROM disks, as well as various forms of RAM, ROM, PROM, EPROM, FLASH-EPROM, solid state media such as memory cards, and any other form of memory chip or cartridge, or any other medium from which a computer can read. While several examples are provided above, these examples are not meant to be limiting, but illustrative of several common examples, and any similar or equivalent devices or systems may be used that are known to those skilled in the art.

As used in this application, the words "a," "an," and "one" are defined to include one or more of the referenced item unless specifically stated otherwise. The terms "approximately" and "about" are defined to mean +/−10%, unless otherwise stated. Also, the terms "have," "include," "contain," and similar terms are defined to mean "comprising" unless specifically stated otherwise. Furthermore, the terminology used in the specification provided above is hereby defined to include similar and/or equivalent terms, and/or alternative embodiments that would be considered obvious to one skilled in the art given the teachings of the present patent application. While the invention has been described with reference to at least one particular embodiment, it is to be clearly understood that the invention is not limited to these embodiments, but rather the scope of the invention is defined by the following claims.

What is claimed is:

1. A system for administering charitable auctions, the system comprising:

one or more computer devices and computer memory, the computer memory storing executable code that, when executed, enables the computer system to perform a process that comprises the following steps:

receiving list of guests;

receiving an electronic payment identifier for each of the guests;

receiving an authorization signature from each of the guests authorizing payment for winning bids;

generating a donation screen in electronic form, in response to the receipt of the authorization signature, that includes a donation button that indicates the guest would like to donate a surcharge donation to a philanthropic cause, and a refusal button that indicates that the guest would not like to donate;

providing the donation screen to the guest who signed the authorization signature;

receiving a selection from the guest of either the donation button or the refusal button;

generating a bid authorization for the guest, wherein the guest is required to select either the donation button or the refusal button before receiving the bid authorization;

conducting the charitable auction, enabling the guests to participate in the auction using the bid authorizations;

determining, for each of the guests who have made purchases during the auction, and who have selected the donation button, a surcharge donation; and collecting payment from each of the guests for any auction purchases, plus any surcharge donations authorized.

2. The system of claim 1, wherein the donation button results in a specific dollar amount being added as the surcharge donation.

3. The system of claim 1, wherein the donation button results in a percentage of a purchase amount of the purchases made in the auction being added as the surcharge donation.

4. The system of claim 3, wherein the guest selects the percentage.

5. The system of claim 3, wherein the percentage is authorized prior to any bidding in the auction.

6. A method for administering charitable auctions, the method comprising the steps of:

providing a system server comprising a computer processor and a computer memory, the computer memory having a database operably installed thereupon;

providing a mobile computer device comprising a computer processor and a computer memory, the computer memory having an administration program operably installed thereupon;

storing a list of guests in the database;

receiving an electronic payment identifier for each of the guests via the mobile computer device;

receiving an authorization signature from each of the guests authorizing payment for winning bids via the mobile computer device;

generating a donation screen in electronic form on the mobile computer device, in response to the receipt of the authorization signature, the donation screen comprising a donation button that indicates the guest would like to donate a surcharge donation to a philanthropic cause, and a refusal button that indicates that the guest would not like to donate;

providing the donation screen to the guest who signed the authorization signature;

receiving a selection from the guest of either the donation button or refusal button;

generating a bid authorization for the guest, wherein the guest is required to select either the donation button or the refusal button before receiving the bid authorization;

conducting the charitable auction, enabling the guests to participate in the auction using the bid authorizations;

determining, for each of the guests who have made purchases during the auction, and who have selected the donation button, a surcharge donation; and collecting payment from each of the guests for any auction purchases, plus any surcharge donations authorized.

7. The method of claim 6, wherein the donation button results in a specific dollar amount being added as the surcharge donation.

8. The method of claim 6, wherein the donation button results in a percentage of a purchase amount of the purchases made in the auction being added as the surcharge donation.

9. The method of claim 8, wherein the guest selects the percentage.

10. The method of claim 8, wherein the percentage is authorized prior to any bidding in the auction.

11. A method for administering charitable auctions, the method comprising the steps of:

providing a system server comprising a computer processor and a computer memory, the computer memory having a database operably installed thereupon;

providing a mobile computer device comprising a computer processor and a computer memory, the computer memory having an administration program operably installed thereupon;

storing a list of guests in the database;

receiving an electronic payment identifier for each of the guests via the mobile computer device;

receiving an authorization signature from each of the guests authorizing payment for winning bids via the mobile computer device;

generating a donation screen in electronic form on the mobile computer device in response to the receipt of the authorization signature, the donation screen comprising a donation button that indicates the guest would like to donate a surcharge donation to a philanthropic cause, and a refusal button that indicates that the guest would not like to donate, wherein the donation button results in a percentage of a purchase amount of the purchases made in the auction being added as the surcharge donation;

providing the donation screen to the guest who signed the authorization signature;

receiving a selection from the guest of either the donation button or refusal button;

generating a bid authorization for the guest only after the guest has selected either the donation button or refusal button;

conducting the charitable auction, enabling the guests to participate in the auction using the bid authorizations;

determining a purchase amount of each guest for all purchases made during the auction;

determining, for each of the guests who have made purchases during the auction, and who have selected the donation button, a surcharge donation, which is the percentage of the purchase amount spent in the auction; and collecting payment from each of the guests for any auction purchases, plus the surcharge donations.

* * * * *